Aug. 11, 1970  J. DONIGER ET AL  3,523,663
TERMINAL FLARE CONTROLLER
Filed March 28, 1968  3 Sheets-Sheet 1

INVENTORS
JERRY DONIGER
FRED J. BELSKY

BY
ATTORNEY

INVENTORS
JERRY DONIGER
FRED J. BELSKY
ATTORNEY

United States Patent Office 3,523,663
Patented Aug. 11, 1970

3,523,663
TERMINAL FLARE CONTROLLER
Jerry Doniger, Montvale, N.J., and Fred J. Belsky, Beverly Hills, Calif., assignors to The Bendix Corporation, a corporation of Delaware
Filed Mar. 28, 1968, Ser. No. 716,904
Int. Cl. B64c 13/50
U.S. Cl. 244—77
8 Claims

ABSTRACT OF THE DISCLOSURE

Apparatus for controlling an aircraft during landing. Signals corresponding to aircraft altitude, altitude rate, altitude acceleration, slant range, slant range rate and pitch attitude, and signals corresponding to desired terminal altitude and altitude rate are provided. The craft is controlled in response to all of said signals for following a flare path to touchdown.

BACKGROUND OF THE INVENTION

Field of the invention

This invention relates to aircraft control apparatus and, more particularly, to apparatus for landing an aircraft.

Description of the prior art

Prior to the present invention, flare controllers known in the art were of the type wherein each variable to be controlled has an operating equation associated with it and the controller operates to provide commands for satisfying the equations. What results is a constant switching to satisfy the individual equations so that predetermined terminal conditions for safe landings are met. The device of the present invention operates on the same type of equations but generates a single command which satisfies all of the equations at any one time and provides more desirable continuous control to touchdown.

SUMMARY OF THE INVENTION

This invention contemplates a terminal flare controller including a first servo effective prior to engagement of the controller for providing an initial solution for time to touchdown in response to slant range and slant range rate signals. After engagement of the controller signals corresponding to acceleration commands as a function of time to touchdown and weighted in accordance with the dynamic characteristics of the aircraft are provided to satisfy predetermined desired terminal altitude and altitude rate conditions. Any discrepancy between these sigals is forced to zero by the first servo which changes the touchdown time accordingly. A second servo is responsive to one of said signals to provide a basic acceleration command, and which command is combined with a pitch attitude signal to provide a pitch control signal for controlling the craft when landing.

One object of this invention is to control an aircraft for landing safely.

Another object of this invention is to control an aircraft when landing so that predetermined terminal conditions are met.

Another object of this invention is to provide an acceleration command signal which is a function of time to touchdown and which satisfies predetermined desired terminal altitude and altitude rate conditions for continuously controlling an aircraft to touchdown.

Another object of this invention is to continuously compute a single command to control an aircraft to touchdown.

Another object of this invention is to provide a single command which satisfies both altitude and altitude rate equations at any one time for continuously controlling an aircraft to touchdown.

Another object of this invention is ot provide a flare controller wherein it is not necessary to minimize tracking errors since no particular track is preselected and disturbances merely cause the track of the craft to change to meet desired touchdown conditions.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
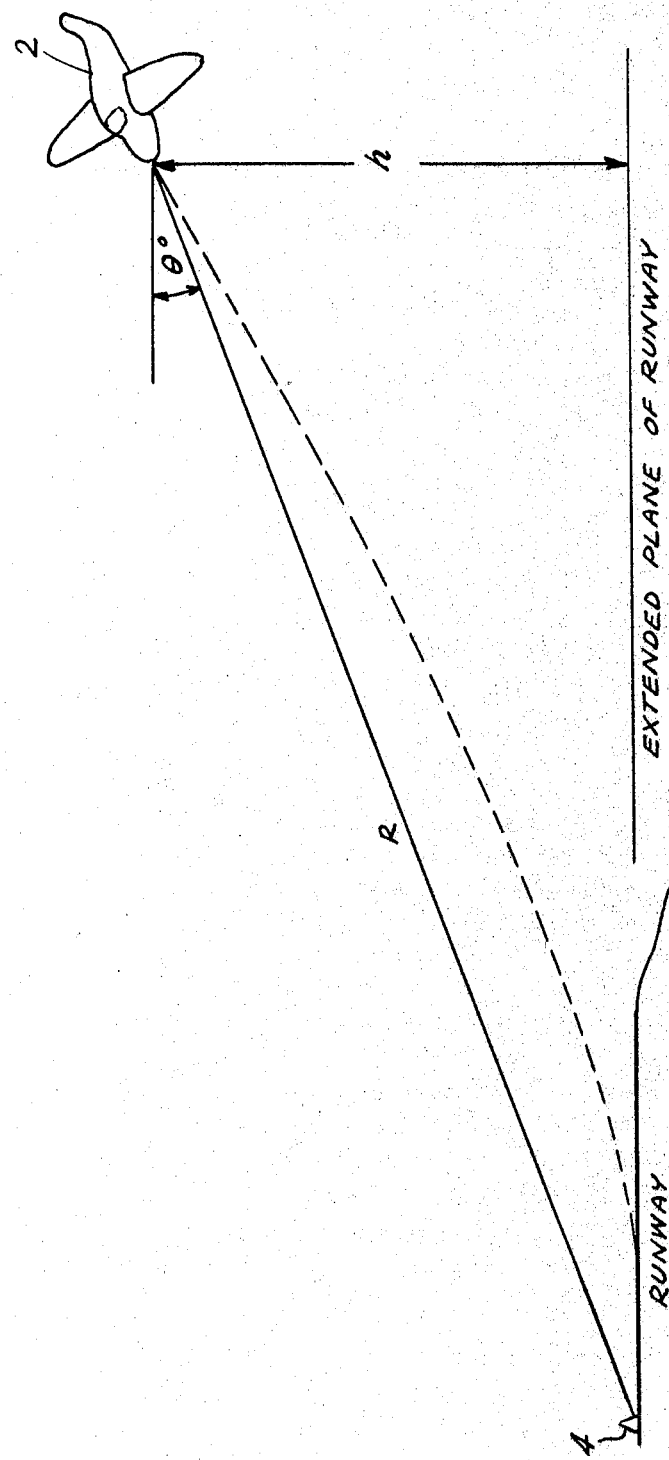
FIG. 1 is a diagrammatic representation of a flight path profile showing the parameters of the present invention.

With reference to FIG. 1, an aircraft 2 is flying a path $\theta°$ from the horizontal and at an altitude $h$ above the extended plane of a runway. Aircraft 2 is at a slant range R from a ground based DME (Distance Measuring Equipment) station 4.

From simple particle dynamics, the position variation of aircraft 2 with time, considering aircraft 2 as an inertialess point mas under the influence of a single force, is determined as follows:

$$F = Ma = \text{constant} \tag{1}$$

$$\dot{h}_{td} = \dot{h}_o + \ddot{h}T \tag{2}$$

$$h_{td} = h_o + \dot{h}_o T + \tfrac{1}{2} \ddot{h} T^2 \tag{3}$$

where $h_o$, $\dot{h}_o$ are known measured quantities considered to be the present conditions for the control situation under consideration, and $h_{td}$ and $\dot{h}_{td}$ are predetermined desired terminal or touchdown values of altitude and altitude rate, respectively. Equations 2 and 3 may be solved simultaneously for altitude acceleration $\ddot{h}$ and for the time to touchdown T. Since aircraft 2 is considered as a particle in space there is no lag considered and $\ddot{h}$ is at once a command acceleration and the actual acceleration of aircraft 2.

The dynamic characteristics of aircraft 2 can be accommodated by assuming a model response of the craft to an acceleration command. As an example, this response may be assumed to be a first order lag as follows:

$$\frac{\ddot{h}}{\ddot{h}_o} = \frac{1}{\tau s + 1} \tag{4}$$

In Equation 4 $\ddot{h}$ is the actual measured acceleration, $\ddot{h}_c$ is an acceleration command and $\tau$ is the system time constant.

After taking the inverse transform of Equation 4 for a step command and considering initial conditions, the following expression is derived:

$$\ddot{h}(\tau) = \ddot{h}_c(1 - e^{-t/\tau}) + \ddot{h}(t_o) e^{-t/\tau} \tag{5}$$

where $\ddot{h}(\tau)$ is the total system acceleration after the step forcing function $\ddot{h}_c$ is applied and $\ddot{h}(t_o)$ is the initial acceleration which, in this situation, is equivalent to the present value of acceleration.

Substituting Equation 5 into Equations 2 and 3, expressions for altitude $\ddot{h}$ and altitude rate $\ddot{h}$ are provided as follows:

$$\dot{h} = \dot{h}_o + \ddot{h}_o T + [\ddot{h}_c - \ddot{h}]\left[\frac{e^{-t/\tau}-1}{\omega}\right] \quad (6)$$

$$h = h_o + \dot{h}_o T + \frac{\ddot{h}_o T^2}{2} + ][\ddot{h}_c - \ddot{h}]\frac{1-e^{-t/\tau}-t/\tau}{\omega^2} \quad (7)$$

wherein:

Equations 6 and 7 may be solved for altitude acceleration command $\ddot{h}_c$ and for time to touchdown T.

Figure 2:
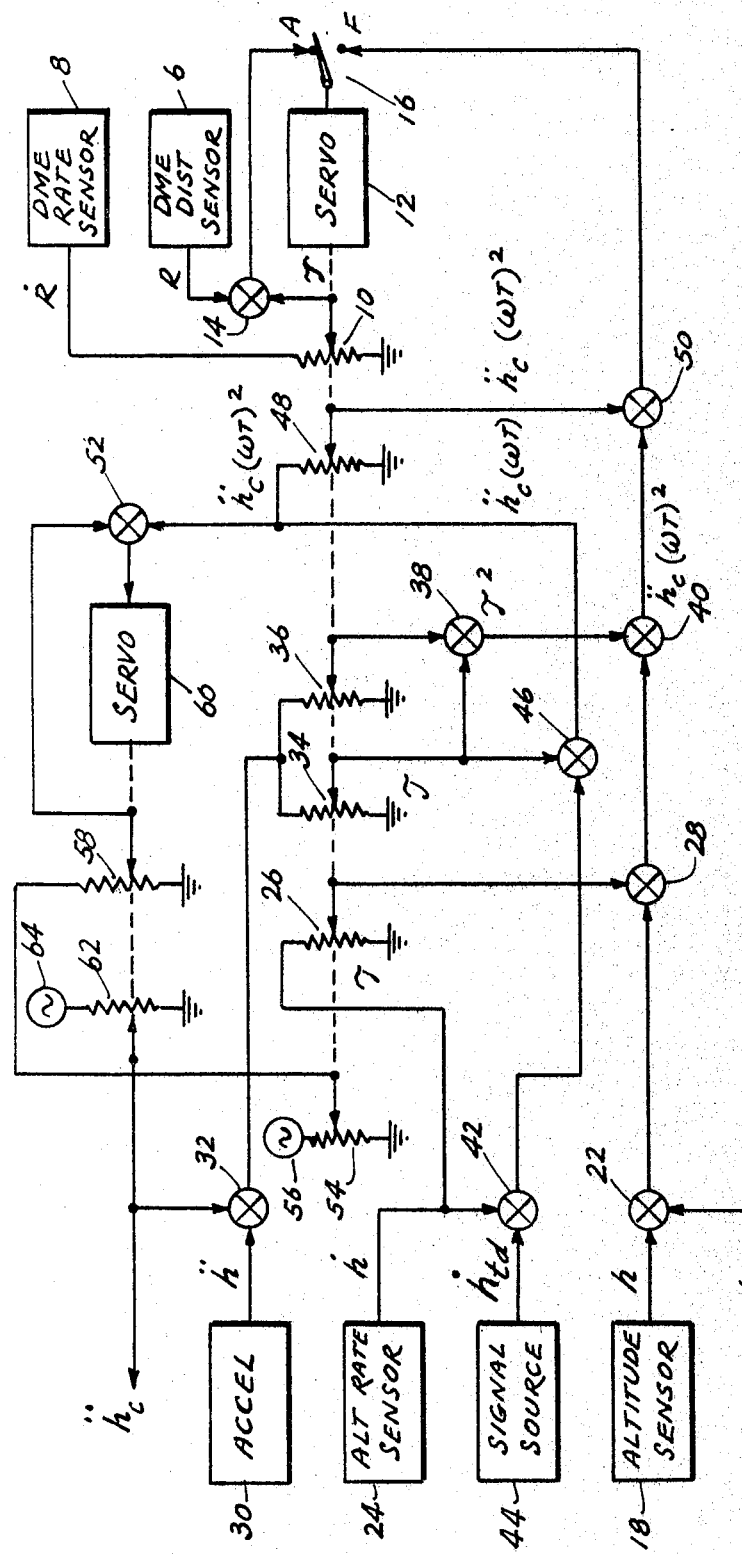
FIG. 2 is a block diagram showing a terminal flare controller according to the invention.

The solution of Equations 6 and 7 is accomplished by the device shown in FIG. 2. A signal R corresponding to the slant range of aircraft 2 from DME station 4 and a signal $\dot{R}$ corresponding to slant range rate are provided by a sensor 6 and a sensor 8, respectively. Slant range rate signal $\dot{R}$ is applied to a feedback potentiometer 10 of a servo 12. The signal provided by potentiometer 10 is applied to a summing means 14 and summed thereby with slant range signal R from DME sensor 6. The summed signal from summing means 14 is applied through a switch 16 in position A shown in FIG. 1, i.e. the flare controller is disengaged and aircraft 2 is in the runway approach mode of flight, for driving servo 12. It is to be noted that when switch 16 is in position F shown in FIG. 2, servo 12 is driven by the output of a summing means 50 as will be hereinafter explained so that the output shaft position of servo 12 corresponds to $T/\tau$. Servo 12 is effective for dividing slant range signal R by slant range rate signal $\dot{R}$ to provide an initial value for touchdown time T. During runway approach, aircraft 2 is usually in unaccelerated flight at some glide slope rate of descent. No restrictions are made as to the magnitude of the initial conditions upon the engagement of the flare controller except that the commanded acceleration is commensurate with safety and passenger comfort.

An altimeter 18 provides a signal $h$ corresponding to the altitude of aircraft 2 and a signal source 20 provides a signal $h_{td}$ corresponding to predetermined desired terminal altitude of aircraft 2. Predetermined desired terminal altitude is usually the height of the aircraft receiving antenna above the ground when the craft is on the ground. Signal $h$ from altitude sensor 18 and signal $h_{td}$ from signal source 20 are applied to a summation means 22 and summed thereby.

An altitude rate sensor 24 provides a signal $\dot{h}$ corresponding to the altitude rate of aircraft 2. Signal $\dot{h}$ is applied to a potentiometer 26 coupled by suitable mechanical means to the output shaft of servo 12. Potentiometer 26 provides a signal corresponding to time constant $\tau$, and which signal is applied to a summing means 28 and summed thereby with the signal from summing means 22.

An accelerometer 30 provides a signal $\ddot{h}$ corresponding to the altitude acceleration of aircraft 2. Signal $\ddot{h}$ is applied to a summation means 32 and summed thereby with an altitude acceleration command signal $\ddot{h}_c$ provided in a manner which will be hereinafter explained. The error signal from summing means 32 is applied to a potentiometer 34 and to a potentiometer 36. Potentiometers 34 and 36 are coupled by suitable mechanical means to the output shaft of servo 12.

Potentiometer 34 provides a signal corresponding to time constant $\tau$, and which signal is applied to a summing means 38 and summed thereby with the signal from potentiometer 36. The summed signal which corresponds to $\tau^2$ is applied to a summing means 40 and summed thereby with the signal from summing means 28. The signal from summing means 40 corresponds to $\ddot{h}_c (\omega T)^2$, in satisfaction of Equation 7.

Altitude rate signal $\dot{h}$ from altitude rate sensor 24 is applied to a summation means 42 and summed thereby with a signal $\dot{h}_{td}$ corresponding to a predetermined desired terminal altitude rate, and which signal $\dot{h}_{td}$ is provided by a signal source 44. The signal provided by summing means 42 is applied to a summing means 46 and summed thereby with the signal from potentiometer 34. Summing means 46 provides a signal corresponding to $\ddot{h} (\omega T)$. Signal $\ddot{h} (\phi T)$ from summing means 46 is applied to a potentiometer 48 coupled by suitable mechanical means to the output shaft of servo 12. The signal from potentiometer 48 corresponds to $\ddot{h}_c (\omega T)^2$ in satisfaction of Equation 6, and which signal is applied to summing means 50 and summed thereby with the output from summing means 40.

Switch 16 is manually or automatically actuated from position A to positino F shown in FIG. 2, and whereby the flare computer of the present invention is engaged. The signal from summation means 50 is applied through switch 16 to servo 12. Any difference appearing at summation means 50 due to differences in the signals from summation means 40 and from potentiometer 48 is forced to zero by the operation of servo 12 which thereupon changes the computed value of touchdown time T accordingly, with the output shaft position of servo 12 corresponding to $$\frac{T}{\tau} = \omega T$$

as heretofore noted.

Signal $\ddot{h} (\omega T)$ from summing means 46 is applied to a summing means 52. A potentiometer 54 coupled by suitable mechanical means to the output shaft of servo 12 and energized by a suitable source of alternating current 56 provides an output signal which is applied to a feedback potentiometer 58 of a servo 60. Potentiometer 58 provides an output signal which is applied to summing means 52 and summed thereby with the signal from summing means 46. Summing means 52 provides a signal for driving servo 60.

A potentiometer 62 is coupled to the output shaft of servo 60. Servo 60 operates to divide the signal from summing means 46 ($\ddot{h}_c \omega T$) by $\omega T$ so that the signal from potentiometer 62 corresponds to an altitude acceleration command signal $\ddot{h}_c$. The command signal is modified to provide a pitch attitude control signal $\theta_c$ to a flight director or automatic pilot system as will next be explained.

Figure 3:
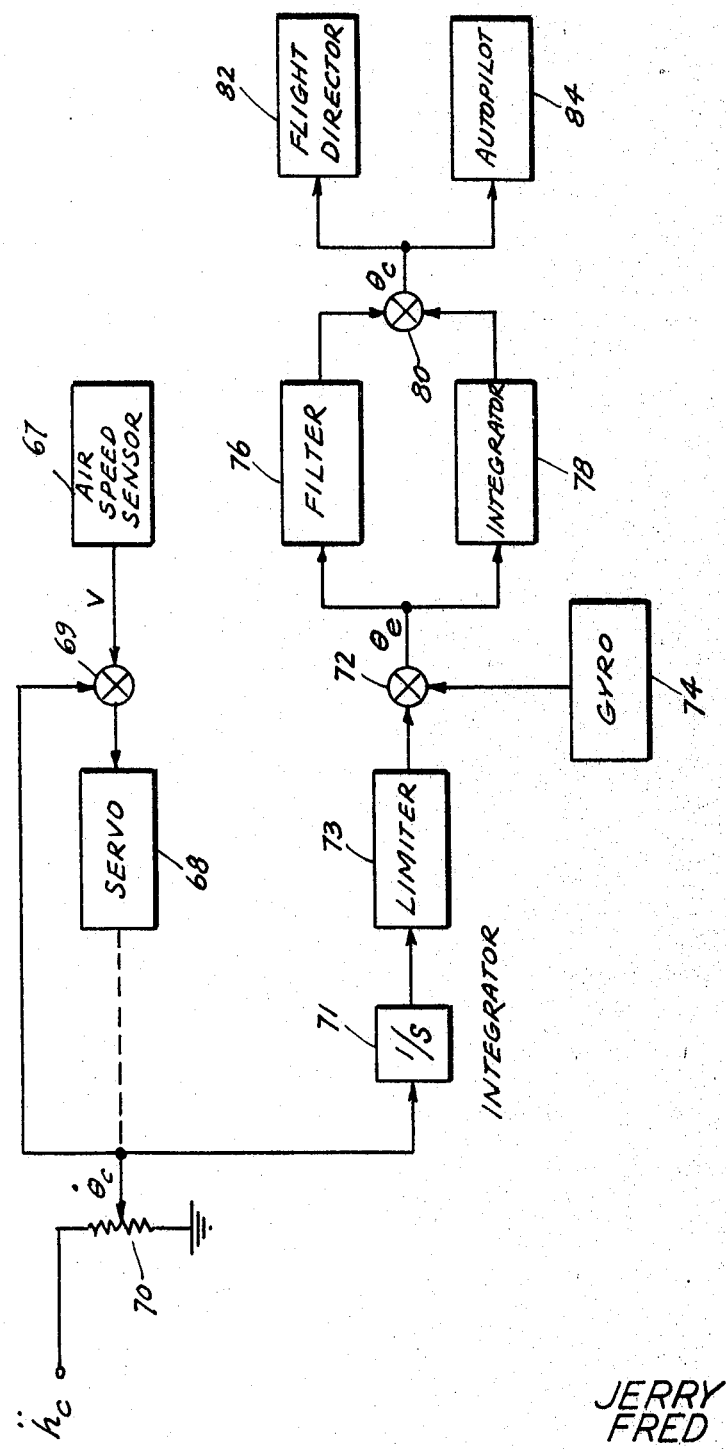
FIG. 3 is a block diagram showing apparatus for converting an acceleration command signal provided by the flare controller of FIG. 2 into a pitch control signal.

Referring to FIG. 3, an airspeed sensor 67 provides a signal V corresponding to the indicated airspeed of aircraft 2. A feedback potentiometer 70 is coupled by suitable mechanical means to the output shaft of a servo 68 and is energized by altitude acceleration command signal $\ddot{h}_c$. Potentiometer 70 provides a signal corresponding to the rate of change of flight path angle and which rate of change is very nearly equal to a pitch rate command $\dot{\theta}_c$. The signal from potentiometer 70 is applied to a summing means 69 and summed thereby with the signal from airspeed sensor 67 for providing a signal to drive servo 68.

The signal from potentiometer 70 is applied to an integrator 71 and therefrom to a limiter 73. The limited integrator signal is applied to a summing means 72 and summed thereby with a signal from a vertical gyro 74 for providing an error signal $\theta_e$. Signal $\theta_e$ from summing means 72 is applied to a lead network 76 and to an integrator 78. The signals from lead network 76 and integrator 78 are summed by a summing means 80 for providing a pitch control signal $\theta_c$, and which signal is applied to a flight director 82 or to an autopilot 84 for controlling aircraft 2 while landing. Lead network 76 and integrator 78 provide the desired stability and accuracy with the pilot airframe combination in response to pitch attitude error signal $\theta_e$.

From the aforegoing description of the invention it is seen that a single command is continuously and automatically computed to satisfy predetermined desired terminal or touchdown altitude and altitude rate conditions.

No open loop programming or high track loop gains are required to minimize track errors since no particular track is selected and disturbances only cause the track of the craft to change to meet the desired touchdown requirements.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A system for controlling an aircraft when landing, comprising:
 means for providing an aircraft altitude signal;
 means for providing an aircraft altitude rate signal;
 means for providing an aircraft altitude acceleration error signal;
 means for providing a slant range signal;
 means for providing a slant range rate signal;
 means for providing a pitch attitude signal;
 means for providing a predetermined terminal altitude signal;
 means for providing a predetermined terminal altitude rate signal;
 first means connected to the aircraft altitude signal means, to the predetermined terminal altitude signal means, to the aircraft altitude rate signal means and to the aircraft altitude acceleration error signal means, and responsive to the signals therefrom for providing a first signal as a function of the dynamic characteristics of the aircraft and the time to touchdown;
 second means connected to the aircraft altitude rate signal means, to the predetermined terminal altitude rate signal means and to the aircraft altitude acceleration error signal means, and responsive to the signals therefrom for providing a second signal as a function of the dynamic characteristics of the aircraft and the time to touchdown; and
 a servo connected to the first and second means and responsive to the first and second signals therefrom so that the output shaft position of the servo is in accordance with the dynamic characteristics of the aircraft and the time to touchdown.

2. A system as described by claim 1, wherein the first means includes:
 first combining means connected to the aircraft altitude signal means and to the predetermined terminal altitude signal means for combining the signals therefrom;
 a first potentiometer connected to the altitude rate signal means and responsive to the signal therefrom, and coupled to the output shaft of the servo for providing a signal in accordance with the dynamic characteristics of the aircraft;
 second combining means connected to the first combining means and to the first potentiometer for combining the signals therefrom;
 a second potentiometer connected to the aircraft acceleration signal means and responsive to the signal therefrom, and coupled to the output shaft of the servo for providing a signal in accordance with the dynamic characteristics of the aircraft;
 a third potentiometer connected to the aircraft acceleration signal means and responsive to the signal therefrom, and coupled to the output shaft of the servo for providing a signal in accordance with the dynamic characteristics of the aircraft;
 third combining means connected to the second and third potentiometer for summing the signals therefrom; and
 fourth combining means connected to the second and third combining means for combining the signals therefrom, and for providing the first signal as a function of the dynamic characteristics of the aircraft and the time to touchdown.

3. A system as described by claim 2 wherein the second means includes:
 fifth combining means connected to the aircraft altitude rate signal means and to the predetermined terminal altitude rate signal means for combining the signals therefrom;
 sixth combining means connected to the third potentiometer and to the fifth combining means for combining the signals therefrom; and
 a fourth potentiometer connected to the sixth combining means and responsive to the signal therefrom, and coupled to the output shaft of the servo for providing the second signal as a function of the dynamic characteristics of the aircraft and the time to touchdown.

4. A system as described by claim 3, including:
 means connected to the sixth combining means and responsive to the signal therefrom for providing an altitude acceleration command signal.

5. A system as described by claim 4, wherein the last mentioned means includes:
 a fifth potentiometer coupled to the output shaft of the servo and energized by a signal from a signal source for providing a signal as a function of the dynamic characteristics of the aircraft and the time to touchdown;
 another servo;
 a feedback potentiometer coupled to the other servo and connected to the fifth potentiometer so as to be energized by the signal therefrom;
 eighth combining means connected to the feedback potentiometer and to the sixth combining means for combining the signals therefrom;
 the other servo being connected to the eighth combining means for being driven by the signal therefrom so that the output shaft position of the other servo corresponds to the acceleration command signal; and
 a sixth potentiometer coupled to the output shaft of the other servo and energized by a signal from a signal source for providing the acceleration command signal.

6. A system as described by claim 1, wherein:
 before engaging the system the servo is connected to the slant range signal means and to the slant range rate signal means and is responsive to the signals therefrom so that the output shaft position of the servo corresponds to time to touchdown.

7. A system as described by claim 1, including:
 means connected to the aircraft altitude signal means, to the aircraft altitude rate signal means, to the aircraft altitude acceleration error signal means, to the slant range signal means, to the slant range rate signal means, to the means for providing a predetermined terminal altitude signal and to the means for providing a predetermined terminal altitude rate signal, and responsive to the signals therefrom for providing an altitude acceleration command signal;
 means for providing a signal corresponding to the speed of the craft;
 means connected to the altitude acceleration command signal means, the aircraft speed signal means and the pitch altitude signal means and responsive to the signals therefrom for providing a control signal; and
 means responsive to the control signal for controlling the craft.

8. A system as described by claim 7, including:
 a servo;
 a feedback potentiometer coupled to the output shaft of the servo and connected to the means for providing an acceleration command signal so as to be energized by the acceleration command signal therefrom;

means for providing a signal corresponding to the speed of the craft;

combining means connected to the feedback potentiometer and to the last mentioned means for combining the signals therefrom;

the servo being connected to the combining means for being driven by the signal therefrom so that the output shaft position of the servo corresponds to the acceleration command signal;

an integrator connected to the potentiometer;

a limiter connected to the integrator;

means for summing the limited integrator signal and the pitch altitude signal;

means for filtering the summed signal;

means for integrating the summed signal;

means for combining the filtered signal and the signal from the last mentioned integrator to provide a control signal; and means responsive to the control signal for controlling the craft to follow a flare path to touchdown.

References Cited

UNITED STATES PATENTS

| | | |
|---|---|---|
| 2,830,291 | 4/1958 | Hecht et al. |
| 3,031,662 | 4/1962 | Bond _____ 343—108 |
| 3,059,880 | 10/1962 | Buxton. |
| 3,265,333 | 8/1966 | Montooth. |
| 3,291,421 | 12/1966 | Kramer et al. |

MILTON BUCHLER, Primary Examiner

J. L. FORMAN, Assistant Examiner

U.S. Cl. X.R.

343—108